Oct. 9, 1951     J. J. CARMO     2,570,640
POULTRY FEEDER
Filed Oct. 18, 1945
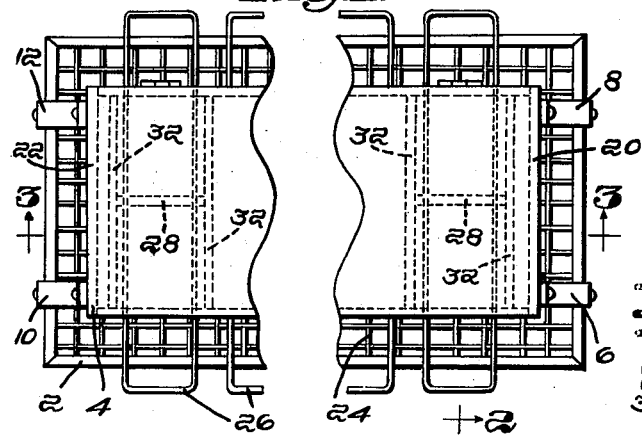
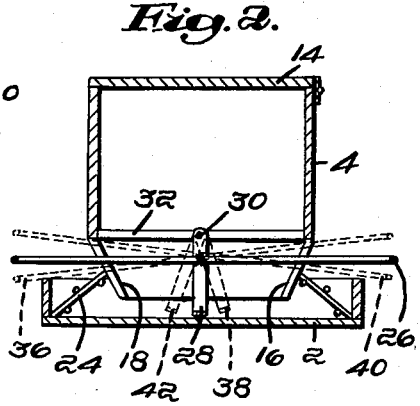
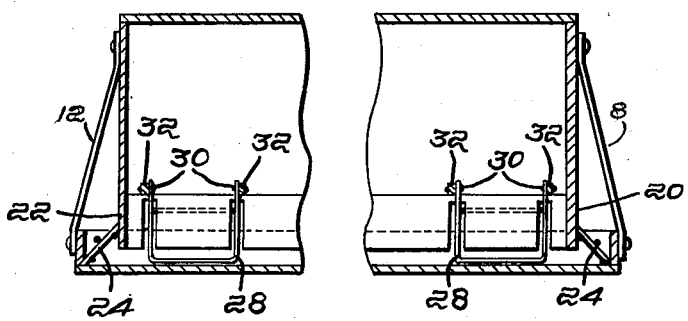
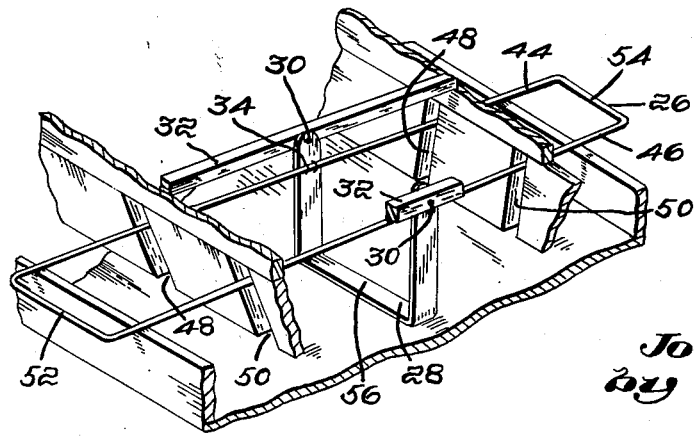
Inventor:
John J. Carmo,
by Yardley Chittick
Attorney

Patented Oct. 9, 1951

2,570,640

UNITED STATES PATENT OFFICE 2,570,640

POULTRY FEEDER

John J. Carmo, Arlington, Mass.

Application October 18, 1945, Serial No. 622,989

2 Claims. (Cl. 119—54)

1

This invention relates to poultry feeders.

The principal object of the invention is to provide an inexpensive and simple bird-operated agitator in combination with a feed-containing hopper and trough, whereby fresh feed will be progressively fed to the trough as it is consumed by the birds.

Numerous poultry feeders have been devised heretofore in which there is agitator mechanism moved from time to time by the birds themselves as they press thereagainst or as they hop on and off platforms which operate the agitating means. Prior constructions, however, have been relatively expensive to manufacture and the cost and lack of simplicity have militated against general adoption.

The present invention seeks to provide an agitator mechanism which may be operated by the birds, used with existing hoppers and troughs, and installed by anyone of ordinary skill without the necessity of employing specially trained workmen. The agitator may be made independently of the hopper and trough to be installed by the poultryman or it may be incorporated therewith prior to its sale.

The nature of the invention will be better understood as the description proceeds with the aid of the accompanying drawings, in which Fig. 1 is a plan view, broken away in part, of a typical feeder utilizing the agitator of the present invention.

Fig. 2 is a vertical section on the line 2—2 of Fig. 1.

Fig. 3 is a vertical section on the line 3—3 of Fig. 1.

Fig. 4 is a broken-away perspective view showing the essential elements of the hopper, trough and agitator.

The agitators of the present invention may be used with a conventional type feeder which consists of a trough 2 and a hopper 4. The hopper may be mounted over the trough in any convenient manner. One form, shown in Figs. 1 and 3, uses supports 6, 8, 10 and 12, which are adequately rigid for this purpose. The hopper 4 may have a hinged lid 14 through which fresh feed may be introduced.

The lower sides of the hopper immediately above the trough slope inwardly as at 16 and 18, thus concentrating the area which is affected by the agitator.

Between the sloping sides 16 and 18 and the end portions 20 and 22 of the hopper is a grillwork 24 which extends around all four sides. This grillwork serves a dual purpose. It prevents

2 the birds from nosing feed over the sides of the trough, and, secondly, it discourages them from attempting to walk on the feed within the trough. The grillwork also provides additional resistance to lateral flow of the feed in the trough as it is induced by the movement of the agitator.

The agitator construction is shown in the several figures. It consists of a rectangularly-shaped bar 26, long enough to extend beyond the sides of the trough a distance sufficient to permit a bird, when feeding in the trough adjacent the bar, to engage the bar with its body to apply a downward force thereto.

The bar 26 is connected to an agitator 28, shown in the drawings as a rigid strip, rod or bar formed to U-shape. The cross-sectional shape of the material forming agitator 28 may be varied. Agitator 28 is pivoted at its top ends at 30 to cross bars 32. The dimensions of agitator 28 are adjusted so that the horizontal portion at the bottom is but a short distance above the floor of the trough. The connection at 34 between bar 26 and agitator 28 must be sufficiently rigid so that when bar 26 is moved up and down agitator 28 will be swung laterally through a limited angle. The nature of this movement is shown diagrammatically in Fig. 2. When bar 26 is moved downwardly at its left end to the position shown at 36, the agitator 28 will move to the right to the position shown at 38. Conversely, when bar 26 is moved downwardly at the right side of the trough in Fig. 2 to the position at 40, the agitator will be moved to the position at 42.

The transversely extending portions of bar 26, namely, parts 44 and 46, are designed to pass by the lower portions of the hopper and extend over the sides of the trough. Parts 44 and 46 may be shaped either to pass entirely under the sloping sides 16 and 18 of hopper 4, or they may pass through narrow slots 48 and 50. These slots are wide enough to permit free up and down movement of bar 26, but at the same time are narrow enough so that only a negligible amount of feed will escape therethrough to the sides of the trough. Such feed as does escape is so limited in quantity that it does not materially affect the lateral distribution caused by movement of the agitator.

The crossbars 32 carrying the agitator mechanism may be easily installed in the hopper by cutting to suitable length and then affixing them in any convenient manner, as by nailing or screwing.

From the foregoing description, it is believed apparent that a poultry man having a hopper and trough of conventional design, such as shown in Fig. 2, could easily insert a series of agitators by sawing the necessary number of slots 48 and 50 in the bottom sloping portions 16 and 18 and by introducing a corresponding number of crossbars 32 to which the agitators 28 had previously been attached. As shown in Fig. 1, the number of agitator units in a hopper will depend upon the hopper's length. It is preferable that the agitators be located sufficiently closely together so that no dead spots will develop in the feed.

In operation, the birds in feeding at the sides of the trough engage the outer longitudinal portions of bars 26 causing downward movement thereof and corresponding transverse movement of agitators 28. Birds on the other side of the trough in turn cause reverse movement. Thus, as the feed is consumed, a new supply of fresh feed will be continuously supplied to the sides of the trough.

It is intended, however, that the invention is not to be limited by the present disclosed forms, but only by the appended claims.

I claim:

1. In a poultry feeder, the combination of a trough, a hopper provided with lower side walls positioned over said trough, a plurality of individual agitators for causing feed to flow from said hopper to the sides of said trough at the areas of agitation, each of said agitators comprising a U-shaped rod with the bottom portion thereof extending substantially parallel and close to the bottom of said trough, individual supports for each said agitator attached to the hopper, pivotal means connecting each side of each said agitator to said supports, said hopper having openings through oppositely disposed locations of the lower side walls, and at least one transversely extending bar with longitudinally extending portions at each end connected to each of said agitators close to said pivotal means and passing laterally through said openings and above and beyond the walls of said trough, whereby reciprocating up and down movement of each said bar will cause reciprocating transverse movement of the agitator to which it is connected.

2. In a poultry feeder, the combination of a trough, a hopper provided with lower side walls positioned over said trough, a plurality of individual agitators for causing feed to flow from said hopper to the sides of said trough at the areas of agitation, each of said agitators comprising a U-shaped rod with the bottom portion thereof extending substantially parallel and close to the bottom of said trough, individual supports for each of said agitators attached to and extending crosswise of the hopper, pivotal means connecting the sides of each said agitator to said supports, said hopper having openings through the lower sides, and a plurality of bars each bent to generally rectangular form with the long sides thereof extending transversely of said trough, one bar being connected to the sides of each of said agitators and passing laterally through said hoppers and above and beyond the walls of said trough, the short ends of said generally rectangularly bent bars providing suitable lengths of bar against which birds may push.

JOHN J. CARMO.

REFERENCES CITED

The following references are of record in the file of this patent:

UNITED STATES PATENTS

| Number | Name | Date |
| --- | --- | --- |
| 93,263 | Wilson | Aug. 3, 1869 |
| 116,971 | Lewis | July 11, 1871 |
| 316,557 | McClure | Apr. 28, 1885 |
| 947,684 | McEachron | Jan. 25, 1910 |
| 1,283,464 | Brown et al. | Nov. 5, 1918 |
| 1,343,817 | Gilbert | June 15, 1920 |
| 1,874,137 | Steel | Aug. 30, 1932 |
| 2,229,238 | Cash | Jan. 21, 1941 |
| 2,357,698 | Stafford | Sept. 5, 1944 |
| 2,363,212 | Wagner | Nov. 21, 1944 |